Nov. 27, 1928.

E. A. GALLISON 1,692,985

MACHINE FOR SCALING FISH

Filed Feb. 19, 1927  2 Sheets-Sheet 1

Ernest A. Gallison
Inventor

By Roberts Cushman & Woodbury
Attorneys

Nov. 27, 1928.  
E. A. GALLISON  
MACHINE FOR SCALING FISH  
Filed Feb. 19, 1927    2 Sheets-Sheet 2

1,692,985

Ernest A. Gallison  
Inventor

By Roberts Cushman & Woodbury  
Attorneys

Patented Nov. 27, 1928.

1,692,985

UNITED STATES PATENT OFFICE.

ERNEST A. GALLISON, OF WATERTOWN, MASSACHUSETTS, ASSIGNOR TO BAY STATE FISHING COMPANY, OF BOSTON, MASSACHUSETTS, A CORPORATION OF MAINE.

MACHINE FOR SCALING FISH.

Application filed February 19, 1927. Serial No. 169,624.

This invention relates to machines for removing the scales from fish. These machines are adapted to receive fish fed thereto manually or by any suitable means, such as an inclined chute. Gravity may also be depended upon for moving the fish between scale-removing elements of the machines, these elements themselves being the only parts of the machines to which it is necessary to apply mechanical power. The scale-removing elements, furthermore, act as brakes or drags to retard the dropping movement of the fish as they pass through the machines.

In order to allow a machine to accommodate fish of various sizes, and in order to permit the spills of scale-removing elements more effectively to act upon various parts of the fish, certain scale-removing elements may be yieldably disposed in relation to other similar elements in order to provide a central opening or passage of variable size. Furthermore, these elements may be arranged in pairs, one element of each pair being designed to rotate in an opposite direction and at a different speed than the other element thereof.

This relative movement of the scale-removing elements or brushes at different speeds causes a fish which passes through the central opening to have a more or less rotary movement so that practically every point upon the fish follows a more or less helical path, thus all parts of its body are exposed to the action of the scale-removing spills.

A machine of this character is very simple, has only a small number of moving parts, and is adapted to cooperate conveniently and effectively with other fish treating and conveying means, for example being readily located in a vertical chute or passageway between different floors of a fish packing plant.

The above and further objects and advantageous features of the invention will become apparent to those skilled in the art from a reading of the description and claims in conjunction with the accompanying drawings, in which:

Figure 1:
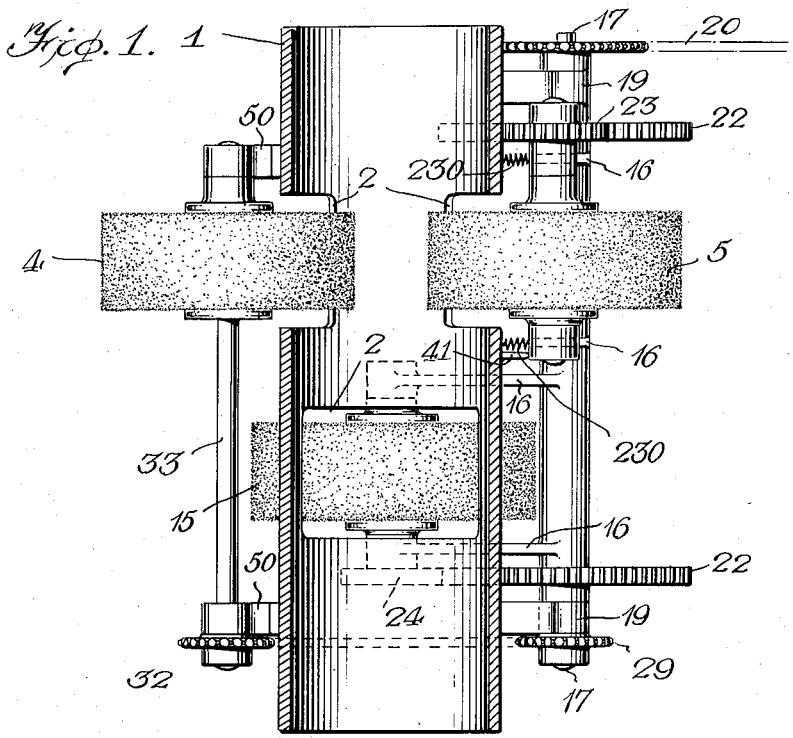
Fig. 1 is a central vertical section through one form of fish-scaling machine.
Figure 2:
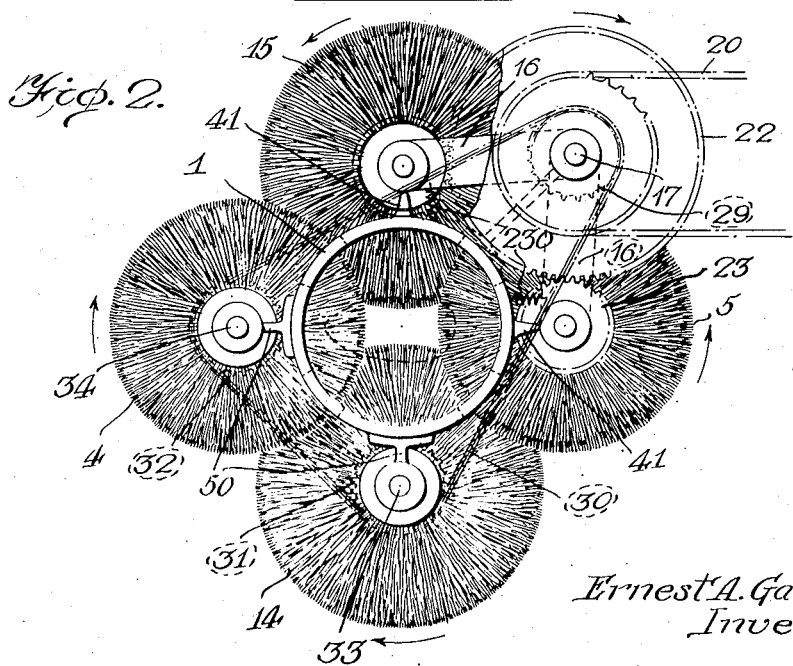
Fig. 2 is a top plan view of the machine shown in Fig. 1.

Referring more particularly to the form of the invention illustrated in Figs. 1 and 2, a central supporting casing 1, preferably of open cylindrical form, is provided to receive fish dropped therein at its upper end. A plurality of scale-removing elements, preferably rotatable brushes, are disposed about the walls of the casing 1, opposite brushes being so arranged and disposed that one of them is yieldably pressed toward the other and so that one of them has a somewhat higher rotary speed than the other. The machine is preferably provided with a plurality of pairs of brushes so that a fish dropped in the casing 1 may pass between successive pairs of brushes. While the drawings show two pairs of brushes, it is to be understood that in many instances it will be found desirable to use a larger number of scale-removing elements. In order to permit peripheral portions of the brushes to project inward within the casing 1 and to act upon a fish passing through the central part thereof, the wall of the casing is broken away to provide openings 2 (Fig. 1).

One of each pair of brushes preferably has a fixed axis; for example, brushes 4 and 14 (Fig. 2) are rotatably supported upon the fixed brackets 50. The opposing brushes of each pair are preferably yieldably mounted, and for this purpose the axes of brushes 5 and 15 are mounted at the outer extremities of arms 16 which swing about a fixed upstanding shaft 17, which in turn is secured upon the casing by brackets 19. Suitable spring means 230 yieldably force brushes 5 and 15 inward toward the opposing brushes which have fixed axes, stops 41 limiting the inward movement of the yieldably mounted brushes.

The scale-removing elements are driven by a chain 20 or any other suitable driving element which imparts rotation to the vertically disposed shaft 17. Keyed upon shaft 17 are spur gears 22 which mesh with smaller gears 23 and 24, which are secured to brushes 5 and 15 respectively so that driving effect received through chain 20 is imparted to brushes 5 and 15, and they are rotated in a direction opposite to the direction of rotation of the shaft 17 and gears 22, as indicated by the curved arrows of Fig. 2. The gears 22 are concentrically disposed upon the shaft 17, about which arms 16 are adapted to swing, so that the gears remain in proper mesh with gears 23 and 24 when brushes 5 and 15 swing about shaft 17.

Shaft 17 has a sprocket 29 engaged by an endless chain 30, which is wrapped around sprockets 31 and 32 that are keyed to the axles 33 and 34 respectively of brushes 4 and 14. Thus the latter may be driven at a speed substantially corresponding to that of the shaft 17, the sprockets 31 and 32 being of approximately the same size as sprocket 29, while brushes 5 and 15 may be driven at a more rapid rate due to the large size of the gear 22 as compared to the pinions 23 and 24. Preferably pairs of brushes are spaced from each other in a vertical direction at a distance which is considerably less than the length of the smallest fish which the machine is likely to receive.

In the operation of a machine of this character, fish will drop into the upper end of the casing 1 and between the upper pair of oppositely rotating brushes 4 and 5, the brush 5 swinging outwardly in relation to the brush 4 against the action of springs 230 to accommodate the body of the fish. Thus the fish is yieldably gripped by the rotating brushes 4 and 5 and scales are removed from the same. Furthermore, since one brush rotates more rapidly than the other, there is a tendency to swing the fish about a vertical axis so that successive parts of its body are exposed to the action of the scale-removing elements. The gripping action of the brushes 4 and 5 retards the normal downward movement of the fish due to gravity. However, the fish soon reaches a position wherein it is engaged by the brushes 14 and 15 as well as the brushes 4 and 5, the brushes 14 and 15 engaging the lower portion of the fish while a succeeding portion thereof is being acted upon by the upper scale-removing elements. While the fish is in this position, the larger part of the scales are removed. However, as the scales are removed the fish continues to drop and finally reaches a position wherein it is acted upon only by the lower pair of scale-removing elements. From this point it drops out of the open cylindrical casing 1 to any convenient point of disposition, as, for example, a chute leading to a cutting and filleting machine.

Figure 3:
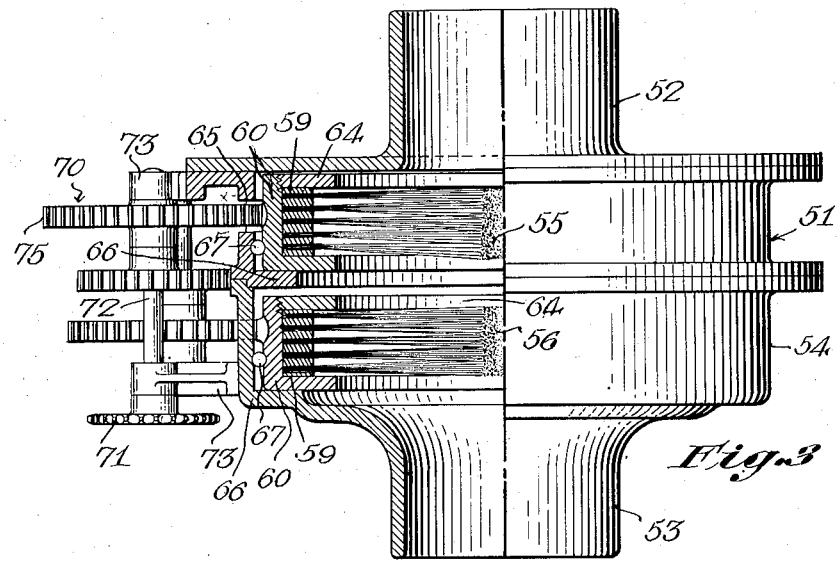
Fig. 3 is a view partly in elevation and partly in central vertical section of a modified form of the invention.
Figure 4:
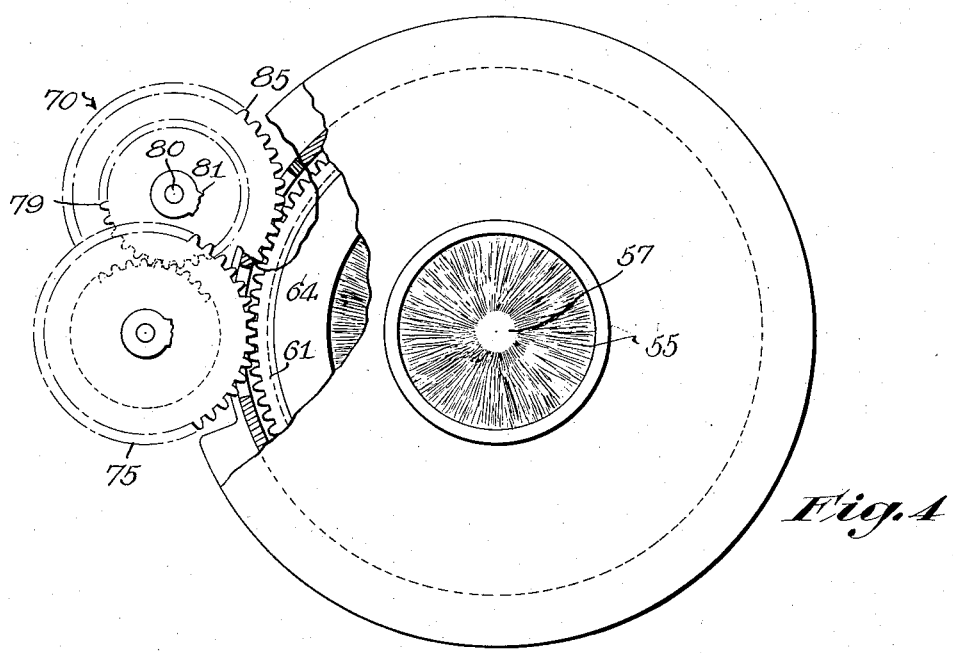
Fig. 4 is a plan view of the type of machine shown in Fig. 3 with a portion of the top wall thereof broken away to show the arrangement of gearing and disposition of the brush elements.

Figs. 3 and 4 show another form of the invention which has many features in common with the type of machine disclosed in Figs. 1 and 2. The body of the machine shown in Figs. 3 and 4 comprises a casing 51 which consists of an intermediate portion of enlarged cylindrical form and entrance and outlet portions 52 and 53 of smaller cross section. Disposed within the larger portion 54 of the casing 51 are a plurality of annular, oppositely rotating scale-removing elements 55 and 56. These scale-removing elements are preferably in the form of annular brushes with inwardly extending spills having their free ends surrounding a central opening 57, which is vertically disposed at the mid-portion of casing 51. The spills of brushes 55 and 56 are fixed in suitable filler elements 59 which are clamped within the annular casings 60 by means of retaining rings 64.

Upon the periphery of each casing 60 is a ring gear 61, the teeth of which mesh with suitable driving gears of the drive mechanism designated in general by the number 70, this drive mechanism being so arranged that the casing 60 and the brushes carried thereby rotate in opposite directions. In order to permit meshing of the gears in this manner, portions of the housing 51 are broken away as indicated by numeral 65, Fig. 3. The housing 51 is provided with inwardly extending annular rings or flanges 66 which support the annular casings 60 and form bearings for the same to permit their rotation, while balls 67 comprise radial bearings for the casings.

Referring more in detail to the driving mechanism 70, it is to be understood that the machine may be driven by a chain which engages driving sprocket 71, which is mounted upon the vertically disposed shaft 72, which in turn is supported upon the fixed brackets 73. A gear 75 keyed to shaft 72 engages one of the ring gears 61 as that of the upper scale-removing element 55. This gear 75 also engages a corresponding gear 79 upon a counter shaft 80 supported upon brackets 81 (Fig. 4). Keyed to shaft 80 is a gear 85 preferably corresponding in dimensions to gear 75 and meshing with the ring gear 61, which serves to drive another scale-removing element such as brush 56.

It is evident that the form of the invention shown in Figs. 3 and 4 provides a central opening 57 for the reception of fish dropped in the inlet 52 of casing 51, the fish rapidly dropping to a position wherein they are acted upon by the oppositely moving spills of superimposed scale-removing elements, the rotation of these scale-removing elements tending to retard the movement of the fish due to gravity.

It is to be understood that in this form of the invention the flexibility of the spills of the scale-removing elements is depended upon to enable these elements to adapt themselves to fish of varying sizes and that the scales drop through the outlet 53 together with the fish, suitable auxiliary means, not shown, being provided to remove the scales.

While for the purposes of simplicity of illustration I have shown but two superimposed scale-removing elements, it is to be understood that in practice, it may be preferable to use a larger number of oppositely rotatable brushes.

I claim:

1. In a machine of the class described, a casing having an entrance end above an emission end, a series of rotatable brushes disposed about the peripheral portion of the casing, and providing a central opening for the passage of a fish, successive brushes being rotatable in opposite directions, whereby a fish dropped through the central opening may be retarded and scales may be removed therefrom.

2. In a machine of the class described, a casing providing a substantially vertically disposed central opening, brushes rotatable about substantially vertical axes and having their peripheries located at various levels about the central opening.

3. In a machine of the class described, a casing providing a substantially vertically disposed central opening, brushes rotatable about substantially vertical axes and having their peripheries located at various levels about the central opening, certain of said axes being fixed in relation to the casing, and other of said axes being yieldably maintained in a variable position.

4. In a machine of the class described, a casing providing a substantially vertically disposed central opening, brushes rotatable about substantially vertical axes and having their peripheries located at various levels about the central opening, certain of said axes being fixed in relation to the casing and others being mounted upon swinging arms yieldably pressed inward toward the opening.

5. In a machine of the class described, pairs of rotatable brushes located above each other, the brushes of each pair being disposed at opposite sides of a downwardly extending central opening, one of the brushes of each pair being rotatable about a fixed axis, and the other being rotatable about an axis that is yieldably pressed inward toward the opening and the opposite brush with the fixed axis.

6. In a machine of the class described, pairs of rotatable brushes located above each other, the brushes of each pair being disposed at opposite sides of a downwardly extending central opening, one of the brushes of each pair being rotatable about a fixed axis, and the other being rotatable about an axis that is yieldably pressed inward toward the opening and the opposite brush with the fixed axis, driving means for said brushes, said means being arranged to drive one brush of each pair at a higher speed than the other brush of the same pair.

7. In a machine of the class described, rotatable brushes spaced to provide a central, downwardly extending opening, driving means for said brushes, said means being arranged to rotate certain brushes in opposite directions and at different speeds than other brushes.

8. In a machine of the class described, pairs of rotatable brushes located above each other and spaced to provide a downwardly extending opening, the brushes of each pair being disposed at opposite sides of said downwardly extending central opening, and driving means for said brushes, said means being arranged to rotate one brush of each pair at a higher speed than the other brush thereof.

Signed my me at Boston, Massachusetts, this 16th day of February, 1927.

ERNEST A. GALLISON.